United States Patent
Brown

[15] 3,690,205
[45] Sept. 12, 1972

[54] COMPOSITE PLASTIC PUNCH PRESS STRIPPER

[72] Inventor: Richard H. Brown, Williamsville, N.Y.

[73] Assignee: Pivot Punch Corporation, Lockport, N.Y.

[22] Filed: July 15, 1970

[21] Appl. No.: 54,920

[52] U.S. Cl. ................................................83/139
[51] Int. Cl. ..............................................B26d 7/06
[58] Field of Search........83/139, 140, 142, 465, 453, 83/138

[56] References Cited

UNITED STATES PATENTS

| 3,211,035 | 10/1965 | Whistler | 83/139 |
| 2,867,276 | 1/1959 | Taylor | 83/139 |

*Primary Examiner*—Andrew R. Juhasz
*Assistant Examiner*—Leon Gilden
*Attorney*—Bean & Bean

[57] ABSTRACT

A composite plastic stripper for stripping a punched workpiece from a punch of a punch press or similar machine as the punch is withdrawn, includes a hollow tubular polyurethane body portion, a nylon end cap and an adhesive fastening the nylon and polyurethane parts together. The resiliency and flowability of the polyurethane tubular portion provides a spring effect which holds the work to a support while the punch is being withdrawn. The nylon cap, which is harder than the polyurethane, is a long lasting contact part which does not wear out despite repeated punching operations in which it is contacted with the workpiece. It also transmits the force of contact with the workpiece over substantially the entire end of the polyurethane tube to which it is sealed.

9 Claims, 11 Drawing Figures

PATENTED SEP 12 1972

INVENTOR.
RICHARD H. BROWN

BY

Bean & Bean
ATTORNEYS

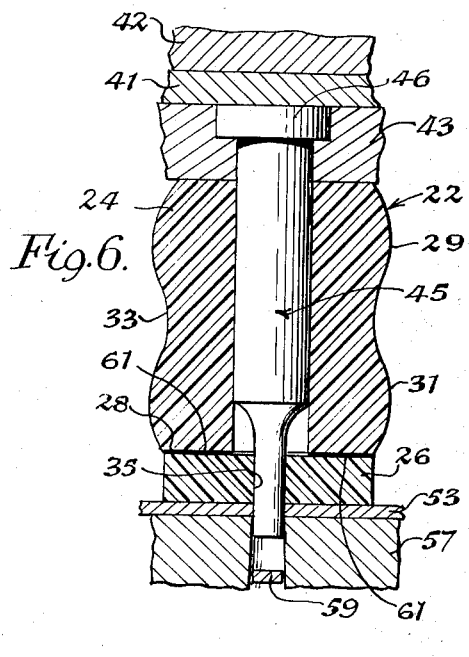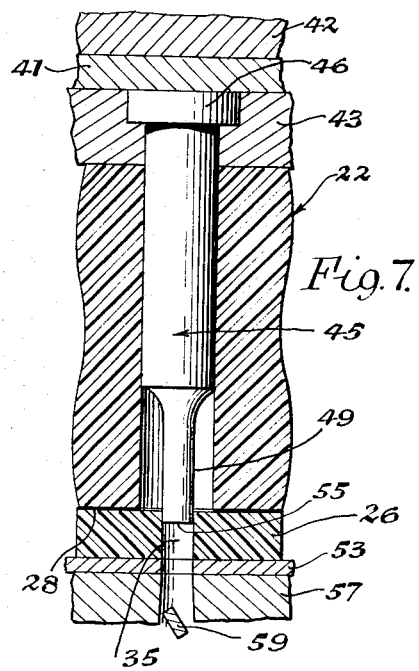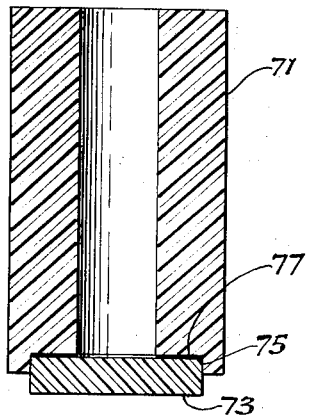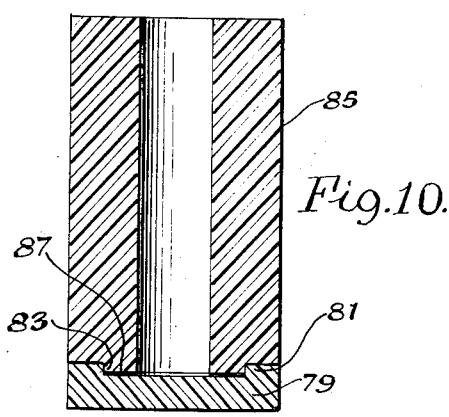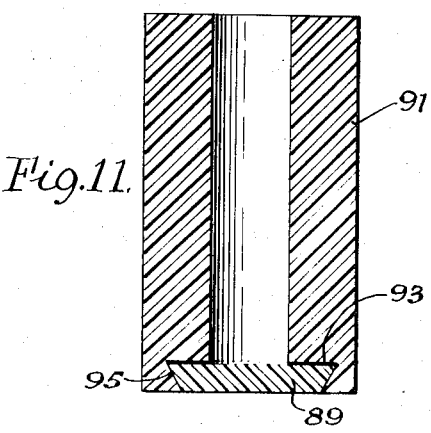

COMPOSITE PLASTIC PUNCH PRESS STRIPPER

INTRODUCTION

This invention relates to a composite plastic punch press stripper for removing a punched workpiece from a punching element. The stripper includes a hollow tubular polyurethane body portion which is resilient and upon returning to its original shape after a punching operation, separates the punch and the workpiece, a nylon end cap for the polyurethane tube, which contacts the workpiece and distributes holding forces over it, and an adhesive between the nylon and polyurethane parts, which joins them together. The invention also relates to a punching apparatus including such a stripper.

BACKGROUND OF THE INVENTION

In the punching, perforation, stamping, broaching, piercing or other mechanical operations in which a punch, die punch or penetrating element is passed into or through workpieces, there is often a tendency for the workpiece to adhere to the forming machine element when that element is removed. To counteract this tendency, springs have been incorporated in the forming machine (hereafter referred to as a punch press or punch machine, a preferred embodiment of such forming devices), which would be compressed upon movement of the forming die punch against the workpiece and would return to original shape when the punch was removed from the workpiece. Thus, the springs or contact members connected to them usually held the workpiece flat against a supporting member as the punch was removed, preventing the workpiece from following the punch or from being distorted, inverted or dimpled by a partial movement out of its plane, toward the receding punch. Such inversion would be prevented by having only a slight clearance between the working portion of the punch and the part of the spring pressing against the workpiece. Of course, metal springs are susceptible to corrosion, have to be oiled and, when overstrained, may shatter, causing damage to the punch or the machine and possibly, also to operating personnel.

Because of these disadvantages, the metal spring means were replaced by rubber parts, such as attachments to the bodies of punches which would be pressed against the workpiece as the punch was lowered and would push the workpiece away from the punch as it was removed, after completion of the punching operation. Rubber often becomes degraded, either softened or embrittled, especially in the presence of oils, and lubricating oils are generally present on the punches to facilitate their operation. To protect the rubber, sometimes metal covers would be employed on the contact ends of the rubber strippers. These could mar the work and very often, would not satisfactorily protect the rubber.

With the advent of synthetic rubbers and organic polymeric materials, some of these have been suggested as replacements for the rubber of the strippers. For example, molded polyurethane strippers, either of a single piece or with a separate polyurethane cover on an end thereof have been described. Although such strippers possess desirable resilient characteristics and are generally resistant to the adverse effects of oils and corrosive materials, they do not lend themselves to easy on-the-job preparation or modification and often require either custom molded parts or relatively expensive forming operations. Even in instances when a harder polyurethane would be employed so that the portion of the stripper contacting the workpiece would not be as easily worn or cut from repeated contacts with the work under compression, the polyurethane parts would still wear out faster than desirable.

DESCRIPTION OF THE INVENTION

The disadvantages of the prior art strippers have been overcome by the present invention. It provides a contact surface of nylon which can withstand repeated sharp shocking contacts with a workpiece without failure. The nylon, which is harder than polyurethane parts, tends to distribute the force of the descending punch over a larger area of the workpiece and thereby firmly holds the workpiece in position under the punch at the start of the punching operation. This is due in part to the excellent bearing properties of the nylon, which are superior to those of most other plastics. The nylon end caps can be shaped to conform to the contours of the work being punched and can be employed in substantial thicknesses or as thin parts with very little distortion. They do not dent or scratch the surfaces being punched nor do they "grab" the work and cause it to be moved or angled on contact therewith. Furthermore, the nylon cap does not tend to tear open, if a sharp piece of metal or a rough edge should be contacted by it, whereas this is a tendency of polyurethane or other elastomeric or "flowing" plastics under strain. Also a significant advantage of the present invention is the standardization of the component parts which is possible. The polyurethane body portion may be tubing which is cut to the desired length and does not require special molding or machining. The nylon end cap may be pressed, cut, punched or otherwise severed from a flat sheet or bar thereof. It is a simple matter then to cement the parts together and, if it is desired to change the punch, the parts may be separated and other combinations of bodies and end caps may be created on the site and ready for use almost immediately.

In accordance with the present invention there is provided a composite plastic stripper for stripping a punched workpiece from a punch of a punch press or similar machine when the punch is withdrawn from the workpiece along the punching path, which comprises: a hollow tubular polyurethane body portion of such dimensions and physical characteristics as to be resiliently deformable during punching operations due to longitudinal pressure applied at the ends of the tube by the workpiece and the punch press, and returnable to initial shape upon withdrawal of the punch from the workpiece after completion of the punching operation, said return to shape upon withdrawal of the punch and release of longitudinal pressures on the polyurethane tube thereby providing sufficient force to separate the work piece from the punch during punch withdrawal; a harder nylon end cap for the polyurethane tube which is of substantially greater hardness than the tube and is capable of withstanding more repeated contacts with workpieces in punching operations, said end cap capping at least a part of the end of the tube adjacent to the workpiece and acting as a force transmitting member between the workpiece and the polyurethane tube; and an adhesive holding the nylon end cap to the polyurethane tube.

Preferred forms of the invention have the stripper component parts of particular characteristics, chemical compositions, shapes and dimensions. The invention also includes an apparatus for holding, punching and stripping a workpiece which comprises a punch press that incorporates a composite plastic stripper of the type described.

Objects, details, constructions, operations and advantages of the invention will be apparent from the following description, taken in conjunction with the accompanying illustrative drawing of preferred embodiments of the invention, in which drawing:

THE DRAWING

FIG. 6 is a view corresponding to FIGS. 4 and 5 but with the punch having descended farther and having punched out a piece from the workpiece;

FIG. 7 is a view corresponding to FIGS. 4-6 showing removal of the punch from contact with the workpiece and retention of the workpiece in position by the stripper;

FIGS. 9-11 are central sectional elevational views of other stripper designs.

DETAILED DESCRIPTION OF THE INVENTION

Figure 1:
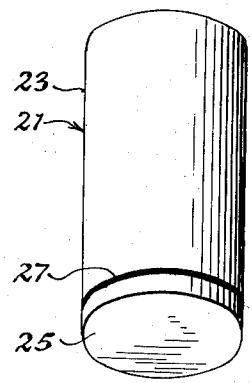
FIG. 1 is a perspective view of the preferred stripper of this invention, before punching out the end thereof.

Composite plastic stripper 21, comprising a solid tubular polyurethane body portion 23 and a solid nylon end cap 25, held together by an adhesive at 27, is a straight walled cylinder, as illustrated in FIG. 1. The stripper is shown as usually sold, without a clearance hole punched in the nylon cap. The invented stripper usually has such hole punched by the user in his machine on which the stripper is employed.

Figure 2:
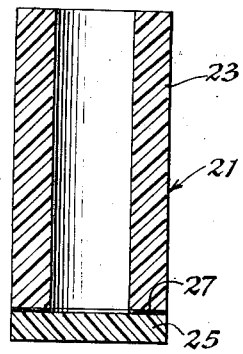
FIG. 2 is a central sectional elevational view of the stripper of FIG. 1.
Figure 3:
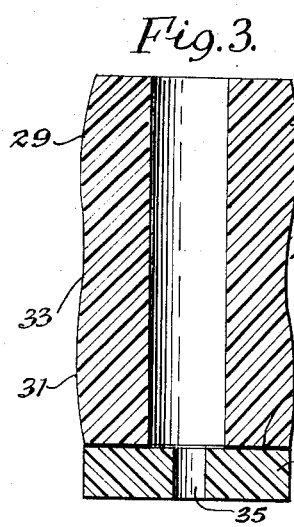
FIG. 3 is a view corresponding to FIG. 2 but showing a heavier duty stripper after punching out therein of a clearance hole for passage of the working portion of a punch.

In FIGS. 2 and 3 are shown sectional views of the stripper of FIG. 1 and a heavy duty stripper, respectively, but in FIG. 3 the nylon disc end cap or plate is designated as 26 and contains a perforation, clearance hole or punched passage 35 for the working end of a punch. Thus, by punching passage 35 in cap 26 by means of the punch, the opening may be perfectly aligned with the travel of the punch during future punch press operations. As is indicated in FIG. 3, heavy polyurethane tube 24 and thick nylon cap 26, held together by adhesive layer 28, make up stripper 22. Due to the force of compression on tube 24 during punching out of hole 35, the tube takes a slight figure-8 set, bulging at 29 and 31 and narrowing at 33 to near its original diameter or thickness.

In FIGS. 4-7, attached to punch press or punching machine 42 by back-up plate 41 is retainer 43, to which is fastened punch 45 comprising a shoulder 46, a body portion 47 and a working punch portion 49. Held onto punch 45 is stripper 22, the internal longitudinal hollow 51 of which is of slightly smaller diameter than the punch body 47. Thus, when pressed onto the punch the cylindrical hollow is stretched slightly and causes the stripper to be held to the punch. Below the nylon end cap 26 of stripper 22 and below the contained punch 45, workpiece 53, into which a hole the size of the punch end 55 is to be made, is supported on a base, supporting member or die 57, which is a part of a punch press 42.

Figure 4:
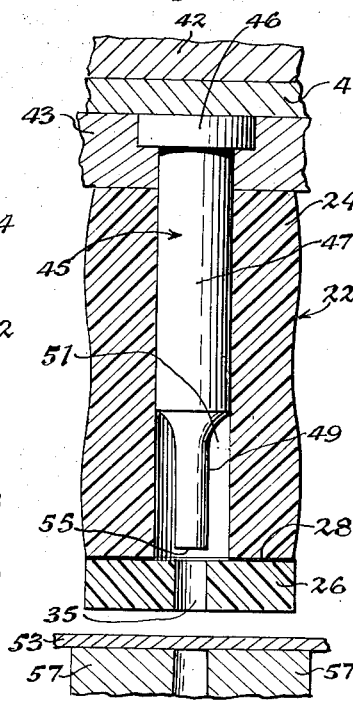
FIG. 4 is a partially sectioned elevational view of a punch press incorporating a stripper as shown in FIG. 3, with the press in position corresponding to the start or finish of a punching operation, with the stripper in normal position and out of contact with a workpiece.
Figure 5:
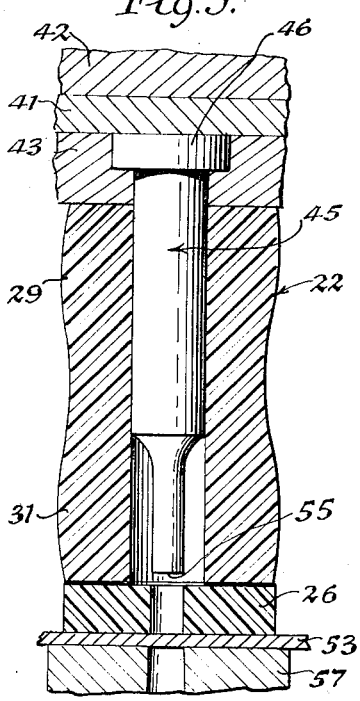
FIG. 5 is a view corresponding to that of FIG. 4 but illustrating the stripper holding the workpiece in position before contact of the punch with the workpiece.

In FIG. 5, stripper 22 is so positioned that punch 45 has not yet contacted workpiece 53 but nylon end cap 26 is pressing workpiece 53 against support 57, holding it in place so that when punch end 55 strikes the workpiece there will be no movement of the work transverse to the punch movement. It will be noted that there has been only a comparatively slight longitudinal compression of stripper 22, so that bulges 29 and 31 are only a little more pronounced than in an unstrained state, as shown in FIG. 4.

In FIG. 6, stripper 22 is much more severely compressed and the polyurethane has "flowed" to such an extent that the protuberances 29 and 31 are much more pronounced. Because of such lateral expansion accompanying longitudinal shortening, the major lateral dimension of the stripper is the greater or greatest bulge diameter and allowance should be made for this is designing stripper equipment. In FIG. 6 the punch 45 is shown in its lowest position, having passed through opening 35 in nylon cap 26 and having driven out a clean slug 59 from workpiece 53, leaving an opening therein.

FIG. 7 shows the withdrawal of punch 45 from contact of its end 55 with any of workpiece 53, while nylon end cap 26 is still in contact with the workpiece, holding it against support 57 and preventing it from riding upwardly while adhering to punch work portion 49. The closed clearance between the end 55 of work portion 49 and hole 35 in nylon cap 26 prevents any inversion of a surface portion of workpiece 53, which could otherwise be caused by adherence of the workpiece to the withdrawing punch. It will be seen that stripper 22 has again lengthened and the lateral bulges thereof have diminished, accompanying withdrawal of the punch. Further withdrawal returns the apparatus to essentially the conformation shown in FIG. 4.

During the distortions of the stripper in a punching operation described, adhesive film 28 holds nylon cap 26 to polyurethane body portion 24 at the lower end thereof 61 and, despite the lateral distortion of body 24 the adhesive forces at the bond are strong enough to prevent distortion of body 24 at that location. Therefore, the adhesive bond holds and nylon plate 26 is firmly fastened to polyurethane body 24 during thousands of repeated punching and stripping operations.

Figure 8:
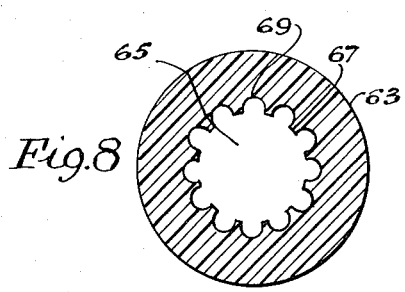
FIG. 8 is a sectional plan view of a stripper having an internal configuration shaped to relieve expension stresses during compression.

In FIG. 8 polyurethane body portion 63 has longitudinal hollow central portion 65 thereof longitudinally grooved at wall 67 so that a plurality of arcuately shaped grooves extends from wall 67 into the solid polyurethane body. Thus, wall 67 bears on the punch and grooves 69 provide expansion volumes for the flow of the polyurethane during compression, diminishing external bulging thereof.

In FIGS. 9–11 additional stripper designs are illustrated and although each possesses some advantages, none is as simple to manufacture and effective in operation as the stripper of FIGS. 1–7. In FIG. 9, polyurethane body or cylinder 71 has a flat nylon cap or washer 73 set into an end of the polyurethane so that lateral movement of the washer with respect to the tube is prevented by wall 75. Although wall 75 alone could not hold washer 73 during punching operations, it does lessen the strains on cement or bonding film 77 which seals the washer and the tube together. In FIG. 10, lateral movement of cap 79 is prevented by skirts 81 which bear against shoulders 83. Again, cap 79 is held to polyurethane body 85 by adhesive film 87, preferably of an epoxy resin cement or bonding agent. In FIG. 11 the bonding of nylon end 89 to polyurethane body 91 by cement 93 is assisted by undercutting of the polyurethane, as at 95, to match the tapered wall of nylon conical section 89.

The materials of construction for the present strippers are known and are commercially available. Resilient solid polyurethane tubings of various suitable physical characteristics, including desired modulus of elasticity, flexural strength, compressive strength, Durometer hardness and creep, are available. Such are described at length in U. S. Pat. No. 3,234,835 and more briefly in U. S. Pat. No. 3,211,035. These polymeric materials are usually polyesters or polyethers obtained by reaction of a polyol or polyester with a diisocyanate and subsequent curing. Physical properties of such polyurethane elastomers are given at page 984 of the Modern Plastics Encyclopedia, 1969–70, Vol. 46, No. 10A (October, 1969) of Modern Plastics. Generally, the hardnesses of such materials are from 48A to 80D (Shore), with the usual range for the present applications being from 80 to 100A and a preferred range being from 85 to 95A (Shore). Compression deflection of the 80 to 100A (Shore) Durometer hardness polyurethanes will be from about 500 to 2,000 at 20 percent deflection, by ASTM test 575. Of course, the various properties of the polyurethanes may be varied and will be chosen to be best for the particular applications contemplated. Usually the more rigid materials will be used when thicker materials are punched, with greater forces required. An example of the polyurethane used is that sold under the trade name Ataprine.

The nylons that are useful for the end caps or washers are usually sheet materials which are the reaction products of hexamethylenediamine and adipic or sebacic acid, and are usually unfilled. Various nylons, such as nylon 6, 6/6, 6/10, 6/12, 12, 13, etc., may be used, providing that they are of sufficient hardness and of acceptable strengths. Durometer hardnesses, tensile strengths, compressive strengths, etc. of some suitable nylons are described in the Modern Plastics Encyclopedia, ibid. at pages 975,976. Compressive strengths will range from 6,000 to 30,000 or no break, using ASTM test D–675, and hardnesses will be from R95 to R120, by ASTM test D785. A suitable nylon is Zytel, sold by E. I. Du Pont de Nemours, Inc., having a hardness of 120D (Shore).

Various bonding agents or cements may be used to firmly attach the nylon and polyurethane parts. It has been found that although a wide variety of adhesives is acceptable, including elastomeric cements, e. g., rubber, neoprene, Buna S; phenol formaldehyde resins; caseins; and animal glues, especially when bonded with synthetic resins; the epoxy cements are much preferred. These bond the thermoplastic and thermosetting polymers firmly, yet releasably, so that they may be held together for hundreds of thousands of punching and stripping operations but are removable by simple mechanical tools when it is desired to replace or interchange them. The epoxies that are curable, usually with amine hardeners, are described at pages 793 of the mentioned encyclopedia. A useful adhesive or cement is that two-component epoxy sold by Dayton Chemical Products Division of Whittaker Corporation as Thixon XAB–975/XAB–976. Of course, suitable primers may be used in conjunction with the adhesives mentioned.

The polyurethane will usually be in the form of a comparatively thick walled tube, generally of an external diameter from 0.5 to 3 inches, preferably from 0.75 to 2 inches, with a wall thickness from 0.25 to 1 inch, preferably from 0.25 to 0.75 inch and a length up to four times the outside diameter, generally from 1 to 4 inches and preferably from 1.25 to 2 inches. Such stripper bodies will usually fit punches having working face diameters of from 0.03 to 1.25 inch. To make the polyurethane stripper body, it is only necessary to cut off the desired length of thick walled tubing. In some cases, the bore in the tubing may be modified but usually it will be desireable to have a variety of tubings available of the desired range of bores. The end to be bonded to the nylon may be roughened before application of cement but this is not always necessary.

The nylon, usually in sheet or strip form, may be punched out as desired. Alternatively, it may be cut from bar stock. It will usually be of a thickness of from 0.050 to 0.5 inch, preferably from 0.06 to 0.25 inch. It too, may be roughened on the face to be cemented. Although it is preferred that the polyurethane body be cylindrical and the nylon be disc shaped, other tubular body portions of various suitable cross sections, e.g., squares, rectangles, hexagons, ellipses, may be used with correspondingly shaped washers. Similarly, the clearance bores or punched out openings in the end cap may be shaped to conform to a variety of punch working surfaces.

The adhesive, cement or other suitable bonding agent usually penetrates slightly into both the polyurethane and nylon parts and additionally, forms a film between them, generally less than 0.050 inch, most often less than 0.010 inch thick. This film and the resulting bond are sufficiently strong to hold the end cap to the polyurethane body and resist shearing separation during compression of the polyurethane. Due to the pattern of flow distortion of the polyurethane, great adhesive film strength is not required since a small holding force there encourages the bulging of the polyurethane at a point at a distance from the adhesive bond. Accordingly, adhesive tensile strengths sufficient to withstand stresses of 10 to 100 lbs. per sq. in. are sufficient and such may be obtained at cement thicknesses as low as 0.001 to 0.003 inch.

The bonding of nylon to polyurethane is preferably effected only at the end of the polyurethane and against a face of the nylon disc. However, as illustrated In FIGS. 9–11, these and related and equivalent structures may be employed, in which, in addition to such bonding forces, the shapes of the components can also aid in maintaining them in desired sealed relationship.

The significant advantages of the present invention have been mentioned previously but several of these will be recounted here in more detail. First, the particular stripper and apparatus structures of the invention function excellently, despite what looks at first glance to be an inadequate way to bond the different parts thereof. Apparently because of the flow patterns of the polyurethane body, the strains on the bonded joint are not severe. A similar strong joint is securable when the means for effecting the bond is fusion of part of a thermoplastic component of the stripper. While holding together satisfactorily, the stripper parts may be made to be removable by simple tools, such as wrenches or pliers, which can permit the exercise of shear and tensile forces to separate the parts, after which they can be interchanged and re-cemented. Accordingly, parts can be used over and over again and inventories of spares can be minimized. Such features are very important in small plants or machine shops.

The nylon end cap withstands punishment that the polyurethane parts cannot take, whether hard or soft. Thus, the elastomeric polyurethanes tend to cut when pressed against sharp or pointed objects, such as metal shavings or chips, and the cuts run, sometimes becoming so long under the strains of repeated compressions and relaxations as to make the stripper inoperative. It is true that the polyurethane parts will withstand repeated expansions and contractions, compressions and relaxations, without failure, providing that the work surfaces are maintained perfectly clean and smooth, but that is a condition not likely to be encountered during all the time of operation of commercial machinery on which the present strippers are intended to be used. Therefore, the improved resistance to cutting possessed by the nylon end caps is of great significance.

Nylon is superior to polyurethane in other important respects, too. For example, it is often desirable to have the lower face of the stripper contact the workpiece at a substantial time differential before contact is made between the working end of the punch and the workpiece. This will prevent wobbling or sliding of workpieces and will be especially important when the hole to be punched is of irregular shape or is on a slanted surface. In such cases it may be desirable to have the stripper exert a force on the workpiece equivalent to from 5 to 500 lbs. per sq. in. To adjust the pressure exerted by the polyurethane tube one would normally have to modify the position of the backing plate on the punch press (lowering to raise pressure) or lengthen the stripper. By providing different thicknesses of the nylon end caps, a measure of control of the length of the stripper may readily be obtained without the need for laying in a stock of polyurethane tubes of different lengths. The different thicknesses of the nylon caps will also be useful in adapting the stripper to operations with punches of small and large working face measurements. Thus, the thin end of a punch is rarely more than three times as long as the punch working face diameter and when small holes are to be made in workpieces, polyurethane ends will be unsuitable, since they are normally at least ¼ inch thick to provide sufficient strengths for exerting pressure against the work being punched. On the other hand, comparatively thin nylon end caps may be used. When heavy workpieces are being stamped or punched, thicker nylon end caps are generally employed. Even when nylon caps are as thick as ½ inch and when the hole to be punched in the cap and a workpiece is as great as ½ inch, these operations can be effected without employing boring tools or special equipment, merely by placing the assembled stripper, less clearance hole, in position on the punch, and allowing the punch press or punching machine to operate. It is not even necessary to slow down the machine or to operate it by hand to make a good clearance hole in the nylon. Such is not the result when a polyurethane end is punched out in the same manner. The polyurethane, being elastomeric, tends to become distorted when any sizable thickness thereof is punched through. However, with the nylon caps, off-center clearance holes and holes of various complex shapes and of different sizes may be created in the described manner.

The scalloped or grooved interiors of the tubes, as illustrated in FIG. 8, are very useful when a plurality of punching operations takes place simultaneously and in close proximity, so that one would want to maintain the expanded thickness of the polyurethane tube at a minimum to avoid contacts with other such tubes. Instead of a scalloping effect, one may employ grooves, spirals, indentations, etc., so long as they provide room for expansion of the polyurethane material during compression and do not prevent its return to "original" position.

The described materials that are used for carrying out the present invention are considered to be especially adapted for their coactive effects. No other elastomers or similar plastics are known which operate as efficiently as the present polyurethanes in the present applications, resisting the effects of oil and corrosive chemicals and withstanding the strains of hundreds of thousands of compressions and returns to original shape. The nylons are excellent bearing materials, are of good strengths and dimensional stability, are non-marking to materials being stamped or punched and are easily fabricated, cut and shaped. With the exception of the polyacetal resins, such as those sold under the names Delrin and Celcon and polytetrafluoroethylene resins, such as Teflon, which are not considered to be as useful or as readily fastened as the nylons, there are no other plastics known to the present inventor which can be usefully and commercially employed as stripper end cap members which will have the previously described desirable properties. Although various cements can be used to fasten the polyurethane to the nylon, those based on epoxy resins have been found to be superior.

The readily obtainable materials of construction and the easy fabrication of the parts from commercially available tubing and sheet or strip materials or rods to produce the desired hollow cylindrical and disc elements of the structures are other important advantages of the invention. Also, the component materials and shapes thereof are available in a wide variety of types.

Cutting to lengths or shaping and assembly of the final strippers are simple operations and no complex or cumbersome apparatus is needed.

Finally, all the above advantages are obtained without the sacrifice of any of the most important stabilities of the plastic parts against oils or chemicals, in which properties polyurethanes and nylons are superior. They are also resistant to oxidation and are capable of operation at elevated temperatures, above atmospheric, such as might be expected to be encountered in punch press operations.

The present invention has been described with respect to certain preferred embodiments and illustrations thereof but it is to be understood that it also encompasses equivalent structures for the same and similar operations.

I claim:

1. A composite plastic stripper for stripping a punched workpiece from a punch of a punch press or similar machine when the punch is withdrawn from the workpiece along the punching path, which comprises: a hollow tubular polyurethane body portion of such dimensions and resiliency as to be held in position about the punch, when relaxed, and of such dimensions and physical characteristics as to be resiliently deformable during punching operations due to longitudinal pressure applied at the ends of the tube by the workpiece and the punch press, and returnable to initial shape, holding tightly to the punch upon withdrawal of the punch from the workpiece after completion of the punching operation, said return to shape upon withdrawal of the punch and release of longitudinal pressures on the polyurethane tube thereby providing sufficient force to separate the workpiece from the punch during punch withdrawal; a hard nylon end cap for the polyurethane tube which is of substantially greater hardness than the tube and is capable of withstanding more repeated contacts with workpieces in punching operations, said end cap capping the tube adjacent to the workpiece, covering at least the open tube end to a clearance for the punch and acting as a force transmitting member between the workpiece and the polyurethane tube; and an adhesive on the end of the tube holding the nylon end cap to it.

2. A composite plastic stripper according to claim 1 wherein the polyurethane body portion is cylindrical, has a wall thickness of 0.10 to 1.0 inch and a length greater than the diameter thereof, up to four times said diameter; the nylon end cap is disc-shaped or disc-shaped with a clearance therein for the punch; and the adhesive or cement is in the form of a film less than 0.05 inch thick between the nylon end cap and the polyurethane tube end.

3. A composite plastic stripper according to claim 2 wherein the polyurethane is of a hardness of 85–95A (Shore), the nylon has a hardness of R95 to R120 and a compressive strength of 6,000 to 30,000 lbs. per sq. in., the adhesive is capable of withstanding tensile stresses of up to at least 10 lbs. per sq. in. and the adhesive is the sole means for fastening the end cap to the end of the cylindrical polyurethane tube.

4. A composite plastic stripper according to claim 3 wherein the adhesive is an epoxy resin composition.

5. A composite plastic stripper according to claim 4 wherein the nylon end cap has an opening in it for passage of the punch which is of essentially the same shape as a cross section of the working end of the punch and the polyurethane body tube is of an internal diameter less than the diameter of the body portion of the punch, whereby the working end of the punch readily passes through the nylon cap opening and, upon withdrawal, the polyurethane tube, after substantial return to shape, is held to the withdrawing body portion of the punch and is moved with it away from the workpiece, after separation of the working portion of the punch from the workpiece.

6. Apparatus for holding, punching and stripping a workpiece which comprises a punching machine, said machine including means for forcing a punch into punching contact with a workpiece and means for withdrawing it from such contact; a punch attached to said means; a base for supporting a workpiece; and a composite plastic stripper for assisting in holding the workpiece to the base at a location where the workpiece is to be punched and for stripping the punched workpiece from the punch when the punch is withdrawn, the stripper comprising a hollow tubular polyurethane body portion which is resiliently deformable during a punching operation due to longitudinal pressure applied at the ends of the tube by the workpiece and the punch press, and returnable to initial shape upon withdrawal of the punch from the workpiece, a hard nylon end cap for the polyurethane tube and an adhesive holding the end cap to the tube, the hollow tubular polyurethane body portion being of an internal opening less than the external dimensions of the punch so that the resiliency of the polyurethane alone holds the stripper to the punch on withdrawal of the punch from the workpiece, and the adhesive is located between the face of the end cap and the tube end and is the sole means for holding the cap to the tube.

7. An apparatus according to claim 6 wherein the polyurethane stripper body portion is a hollow cylinder, the nylon end cap is a flat disc of a diameter equal to that of the tube and the adhesive holding them together is an epoxy resin and is located only on the end of the tube and a matching peripheral portion of the disc.

8. A composite plastic stripper according to claim 1 wherein the polyurethane tube contains internal grooves, the walls of which contact the punch body, which grooves provide room for expansion of the internal portion of the stripper during compression and thereby diminish external distortion thereof.

9. A composite plastic stripper according to claim 5 wherein the polyurethane tube contains internal grooves, the walls of which contact the punch body, which grooves provide room for expansion of the internal portion of the stripper during compression and thereby diminish external distortion thereof.

* * * * *